United States Patent [19]

Schnedl

[11] Patent Number: 5,054,981
[45] Date of Patent: Oct. 8, 1991

[54] SCREW AND TOGGLE FASTENING MEANS
[76] Inventor: Edwin F. Schnedl, 614 South View Ter., Alexandria, Va. 22314
[21] Appl. No.: 605,383
[22] Filed: Oct. 30, 1990

Related U.S. Application Data

[63] Continuation-in-part of Ser. No. 549,144, Jul. 6, 1990, abandoned, which is a continuation-in-part of Ser. No. 369,117, Jun. 21, 1989, abandoned.

[51] Int. Cl.⁵ ............................................. F16B 21/00
[52] U.S. Cl. ..................................... 411/340; 411/346
[58] Field of Search ............... 411/340, 337, 341, 342, 411/343, 346, 344, 345, 436, 437

[56] References Cited

U.S. PATENT DOCUMENTS

| 867,799 | 10/1907 | Cook | 411/346 |
|---|---|---|---|
| 2,081,323 | 5/1937 | Cordes | 411/342 |
| 2,144,895 | 1/1939 | Place | 411/342 |
| 4,043,245 | 8/1977 | Kaplan | 85/3 R |
| 4,283,986 | 8/1981 | Peterson et al. | 411/340 |
| 4,285,264 | 8/1981 | Einhorn | 411/345 |
| 4,406,569 | 9/1983 | Askew | 411/346 |
| 4,449,873 | 5/1984 | Barth | 411/341 |

Primary Examiner—Rodney M. Lindsey
Attorney, Agent, or Firm—Richard P. Matthews

[57] ABSTRACT

A screw and toggle fastener in which the toggle member is formed from spring steel so as to be flexible but non-expandable. The toggle member is provided with a centrally located aperture to permit the threaded insertion of a screw member. The toggle member has a leading portion with respect to the central aperture which may be provided with a pointed leading edge to facilitate insertion through a member to which it is to be attached. A trailing portion of the toggle member is arcuately deformed out of the plane of the leading portion by an amount which permits pivotal movement of the toggle member with respect to the axis of the screw member so that it forms a bridging contact with the threads of the screw member when the toggle member is at right angles to the screw member after passing through the members being fastened together.

8 Claims, 2 Drawing Sheets

SCREW AND TOGGLE FASTENING MEANS

This application is a continuation-in-part of U.S. Pat. No. 07/549,144 filed Jul. 6, 1990 which in turn is a continuation-in- part of U.S. Pat. No. 07/369,117 filed Jun. 21, 1989 each of which are now abandoned.

This invention relates to a screw and toggle mechanism for fastening a plurality of members together and, more particularly, to such a screw and toggle combination where the toggle member is flexible but non-expansible.

BACKGROUND OF THE INVENTION

Heretofore, it has been known to utilize toggle members in combination with screw or bolt members where the person effecting the fastening had access to only one side of the members being fastened. Typical applications for the present invention are found in the installation of drywalls in residential construction where members are attached thereto. It is also applicable in heavier construction applications such as the securement of steel angle members where it is not possible to put a nut on the end of a bolt member. In this instance the use of this invention obviates the need for field welding.

It has been the practice in drywall construction to use expandable toggle members in securing members to the drywall. These expandable toggle members in general have required relatively large holes to be placed in the drywall in order to insert the toggle member behind the drywall. This has been objectionable, especially in apartment complexes where the turnover of tenants is high and walls must be repaired often. The known expandable toggle members have also required a specially designed bolt which has limited choices of diameters and lengths.

Additional shortcomings of the known prior art include the inability of the toggle member to pivot on the bolt or screw member after the toggle member has passed through the opening in the wall to which the toggle member becomes fastened. This makes it impossible to draw the toggle member flush or flat against the blind side of the wall. There is a critical moment at the inception of rotation of the toggle member where the toggle member may slip off the screw member and become lost behind the innermost member being fastened.

Another shortcoming of the known prior art is the failure to provide adequate bearing of the threads of the bolt or screw member against the toggle member after the toggle member has been rotated 90 degrees on the blind side of the wall member. This results in a bending or crushing of the portion of the toggle member adjacent the aperture in the toggle member whereby continued turning of the bolt or screw member results in the bolt or screw member pulling through the toggle member after which the toggle member falls off behind the wall to which it was to be attached.

SUMMARY OF THE INVENTION

The foregoing objectionable features and shortcomings of the known prior art are effectively overcome in the present invention. In particular, the toggle member of the present invention is flexible but non-expandable. It is preferably formed from sheet material, such as spring steel. The toggle member is provided with a generally centrally located aperture to permit the threaded insertion of a screw member. The aperture is sized to receive standard-sized screw members. For example, a standard dry wall screw has a diameter of approximately ⅛ inch and lengths of one to three inches.

The toggle member has a leading portion on one side of the aperture which may be pointed so a to facilitate the insertion of the toggle through a member, such as the drywall, to which it is to be attached. The trailing portion of the toggle member on the other side of the aperture is accurately deformed out of the plane of the leading portion. The toggle member thereby accommodates the screw as the toggle and screw are inserted through the members being joined. The amount of deformation of the trailing portion of the toggle member contiguous to the aperture is slightly less than the outer diameter of the thread on the screw member. The aperture in the toggle member is sufficiently large to permit the toggle member to pivot on the screw member after it has passed through the members being fastened.

The geometry of a single toggle member and a screw member inserted therethrough at an intermediate position between the leading and trailing edges thereof is such that as the screw and toggle member are inserted through a tight fitting hole in the members being joined, there is a slight squeezing or compression of the trailing portion of the toggle member. Once the toggle member has cleared the innermost member being joined, such as the drywall itself, this trailing portion of the toggle springs slightly outwardly away from the axis of the screw member. Then, as the screw member is tightened, it draws the toggle member against the innermost surface of the wall board. A washer member, not illustrated in the drawings, is preferably used beneath the screw head to maintain tension on the toggle.

An important feature of the one piece toggle member is that a very small hole is required to permit insertion of the toggle member and screw in order to effect a blind hole fastening or securement behind a wall. Workmen may carry a handful of the toggle members in their pocket and pick up a readily available standard drywall screw at the job site when a fastening behind the drywall is required.

As a special feature of the present invention, the trailing edge of the toggle member is folded under to provide a double thickness of metal adjacent the aperture in the toggle member for engagement with a screw thread of the screw member. If desired, the leading edge of the toggle member may be folded down to engage one thread on the screw member and the trailing edge folded down to engage the next adjacent thread of the screw member. These turned down portions provide a bridging support and resist pull out of the toggle member.

Additional features of the toggle member of the present invention are that bearing supports are provided between the toggle member and the threads of the bolt or screw member which is substantially more than 180 degrees around the periphery of the thread approaching 360 degrees. An end edge portion adjacent the aperture in the toggle member is turned inwardly toward the screw on the bolt or screw member and at the inception of rotation of the toggle member this inwardly turned portion is in position to engage a screw thread to prevent separation of the toggle member from the screw member before the toggle member has been fully pivoted to a position at right angles to the screw member.

The inherent advantages and improvements of the present invention will become more apparent by reference to the following detailed description of the invention and by reference to the accompanying drawings wherein.

DETAILED DESCRIPTION OF THE INVENTION

Figure 1:
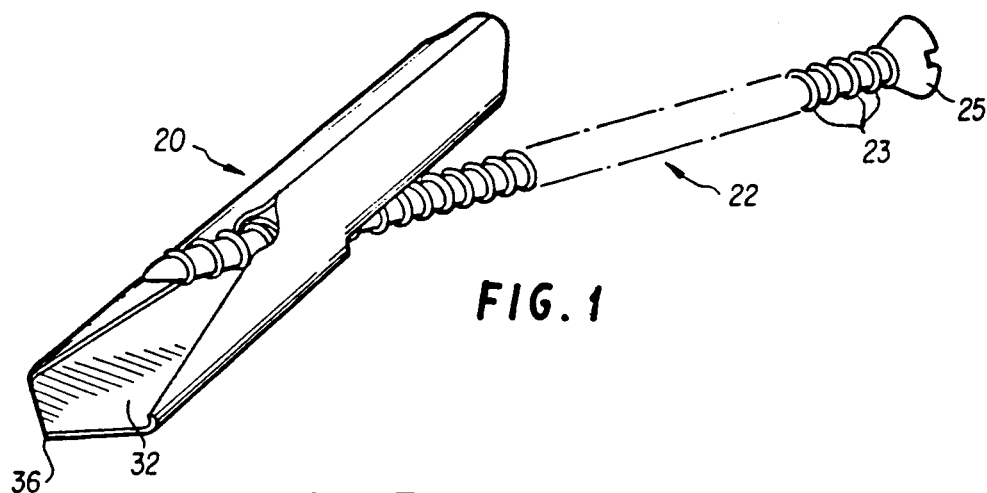
FIG. 1 is a perspective view of the screw toggle device of the present invention.

Referring now to FIG. 1 of the drawings, there is illustrated a flexible, non-expandable toggle member indicated generally at 20 having a screw member 22 threadedly received therein. The screw member 22 is provided with individual threads 23 and a screw head 25.

Figure 2:
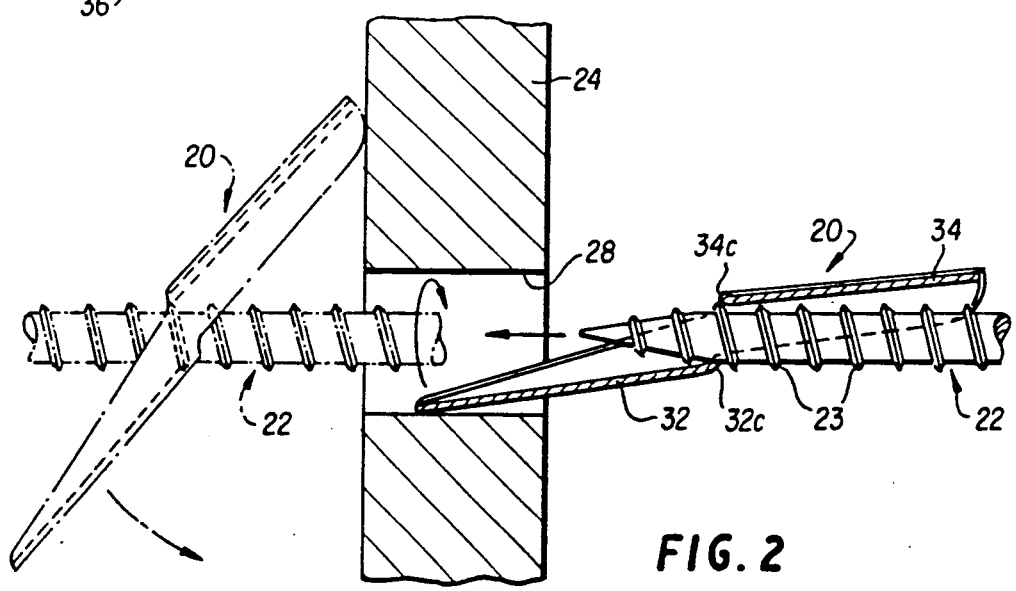
FIG. 2 is a fragmentary elevational view taken in vertical cross section of the screw toggle of FIG. 1.
Figure 3:
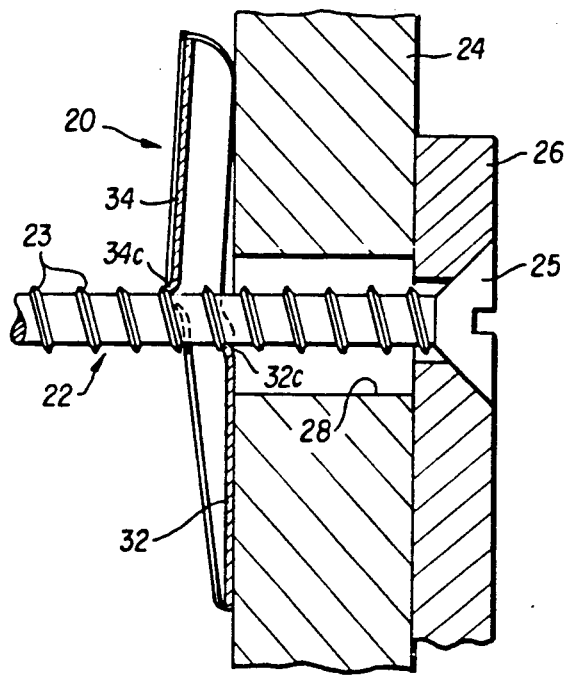
FIG. 3 is a fragmentary elevational view similar to FIG. 1 but illustrating the screw toggle in assembled position.

FIGS. 2 and 3 illustrate the progression of the toggle member 20 and screw member 22 through one of the members to which the combination is to be fastened such as wallboard 24. The member being attached to wallboard 24 is shown fragmentarily at 26 in FIG. 3. This combination of elements may also include a washer not illustrated in the drawings to provide support for the screw member 22 as it is being tightened. While FIGS. 2 and 3 illustrate that the wallboard 24 is provided with a preformed hole 28, it is to be expressly understood that the hole through the wallboard 24 may be made simply by pounding the toggle member 20 through the wall. After the hole has been made by the toggle member itself, the toggle member is withdrawn and the screw inserted through aperture 30 in the toggle member and the combination of members is pushed through the hole in the wallboard. For this purpose, the toggle member 20 is provided with a pointed leading edge 36 as will become evident by reference to FIGS. 4–6 which reveal the detailed construction of the toggle member 20.

Because of the danger of separation of the toggle member 20 from the screw member 22 at the beginning or the inception of the pivotal movement of the toggle member 20 whereby the toggle member 20 drops off and becomes lost behind the wallboard, a leading portion 32 on one side of aperture 30 is provided with a portion 32c which resists and deters separation of the toggle member 20 from screw member 22 by engagement with a thread 23.

Figure 4:
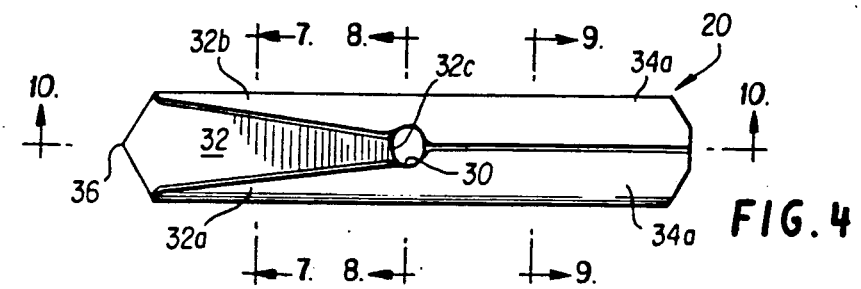
FIG. 4 is a bottom plan view of the toggle element of FIG. 1.
Figure 5:
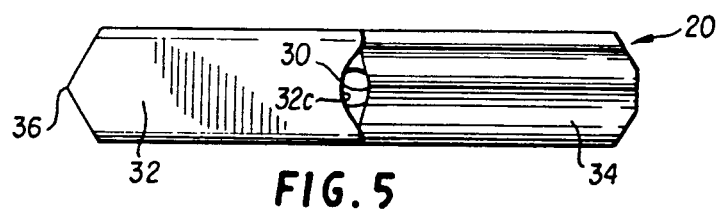
FIG. 5 is a top plan view of the toggle element of FIG. 1.
Figure 6:
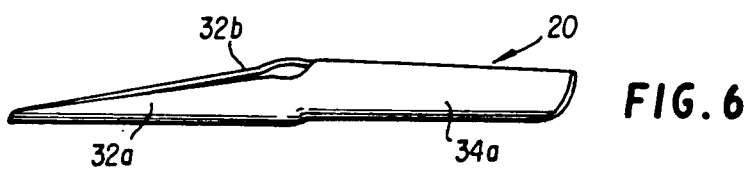
FIG. 6 is a side elevational view of the toggle element of FIG. 1.

Reference to FIGS. 4–6 illustrate the toggle member 20 which is formed from sheet material and has a centrally located aperture 30 circular in cross section which is sized to permit threaded insertion of screw member 22. Toggle member 20 is provided with a leading portion 32 on one side of aperture 30 and a trailing portion 34 on the other side of aperture 30. The leading portion 32 is provided with downwardly and inwardly turned marginal edge portions 32a and 32b as will be further evidenced by reference to FIGS. 7 and 8. Similarly, the trailing portion 34 is provided with downward and inwardly turned marginal edge portions 34a as will be further evident by reference to FIGS. 9 and 10. The pointed end 36 has already been noted for purposes of facilitating the insertion of the combination toggle member and screw member into the innermost member to which the combination is to be attached. It will also be observed by reference to FIGS. 4–10 that the trailing portion has been arcuately deformed out of the plane of the leading portion 32 so as to accommodate the threaded insertion of screw member 22 therethrough. The depth of deformation is slightly less than the outer diameter thread of the screw member 22 so that the toggle member must be pivoted on the screw member after the toggle member has passed through the members being fastened to a position that is at right angles to the screw member and flush against the far side of the innermost member being fastened.

Figures 7, 8, 9:
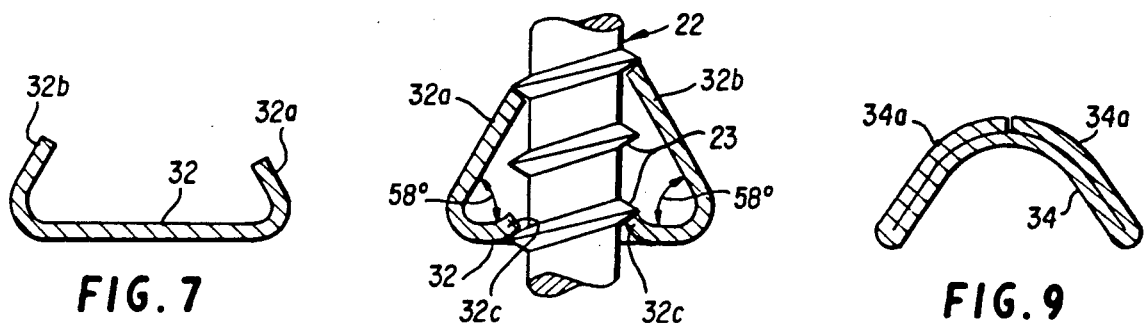
FIG. 7 is an elevational view taken in vertical cross section along line 7—7 of FIG. 4.
FIG. 8 is a fragmentary elevational view taken along line 8—8 of FIG. 4 with a screw in place.
FIG. 9 is an elevational view taken along line 9—9 of FIG. 4.
Figure 10:
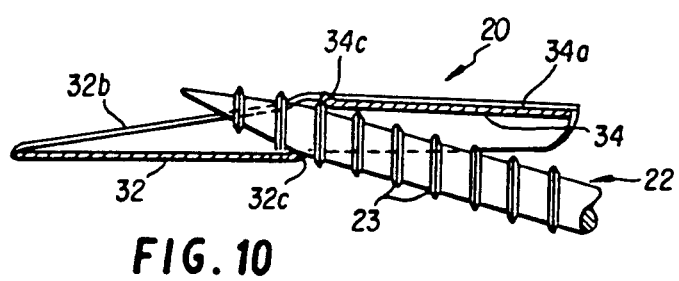
FIG. 10 is a fragmentary elevational view taken in vertical cross section along line 10—10 of FIG. 4 with a screw in place.

Reference to FIGS. 3, 8 and 10 also disclose that the innermost edge of the leading portion 32 adjacent opening 30 has been turned inwardly at 32c. As has already been noted, this functions initially at the inception of the pivoting of the toggle member to prevent separation of the toggle member from the screw member by engagement with a thread 23. After the toggle member has been fully pivoted to the FIG. 3 position, edge 32c and the innermost edge 34c of trailing portion 34 provide a bearing surface against threads 23 to impede the pull out or retrograde movement of the screw member as it is tightened and pulled flush with the backside of wallboard 22 in the FIG. 3 position.

Reference to FIGS. 2 and 3 will illustrate the operation of the screw and toggle fastening combination. In particular, after the screw member 22 is threaded through member 26 which combination may include a washer, the end of the screw 22 is then inserted through aperture 30 in toggle member 20 to reach the position shown in solid lines in FIG. 2. In order to pass through hole 28, the trailing portion 34 of toggle member 20 is slightly squeezed or compressed. Once the toggle member has cleared the innermost members being joined, namely, wallboard 24, the trailing portion of the toggle member springs outwardly slightly away from the axis of the screw member. Therefore, as the screw member is tightened, the screw draws the toggle member against the innermost surface of the wallboard by effecting progressive pivotal movement of the toggle member 20 in the direction illustrated by the phantom arrow in FIG. 2. When the members are completely fastened, the toggle member has been drawn against the innermost surface of the wallboard 24 in the position illustrated in FIG. 3.

The downturned edge portions 32a and 32b of the leading portion 32 and the downturned edge portions 34a of trailing portion 34 provide a bridging support for the toggle member 20 when the toggle member has been fully rotated to a position at right angles to screw 22. This bridging support is provided with respect to individual threads 23 on screw member 22 to resist tensional pulls on the screw member and is illustrated in FIG. 8. Downturned edge portion 32a is slightly shorter than downturned edge portion 34a in the region of aperture 30 to attain a desired result of having one edge portion 32a engage a lower portion of one thread of the screw and the other edge portion 32b engage the upper portion of the same thread. The trailing portion provides a double thickness of metal adjacent the aperture of the toggle member for engagement with one or more screw threads on the screw member. It is also possible to have the downturned edge portions 32a, 32b engage different threads 23 on the screw member.

It is desired to have the toggle member provide as much bearing surface as possible on the inside surface of wallboard 24. For this reason it is preferred to have leading portion 32 bear against the inside surface of wallboard 24 as shown in FIG. 3. It is also possible to provide serrations on the contacting portion of trailing portion 34, not shown, to provide additional gripping surfaces.

Because American Standard threads form an isosceles triangle with respect to the longitudinal axis of the screw, it is preferable to have the downturned portions 32a, 32b and 34a form an angle with respect to the bearing surfaces of the threads that will tend to bow the downturned portions inwardly toward the longitudinal axis of the screw rather than outwardly therefrom This provides a bracing support against the threads of the screw to ensure that the screw member will not be stripped through the toggle member during retrograde movement of the screw. Therefore, as shown in FIG. 8, it is preferred to make the angle between downturned portions 32a, 32b with respect to leading portion 32 slightly less than 60 degrees, such as about 58 degrees, to ensure that the downturned portions bow inwardly under stress resulting from the drawing of said toggle member flush with the backside of wallboard 24 by rotation of screw 22.

For illustrative purposes only, the sheet metal used to manufacture the toggle member 20 may have a thickness of about 1/64th of an inch. This thickness of material is customarily available as standard flashing material. The width of the leading and trailing portions may be about 5/16th of an inch, but may vary depending upon the application and the length of the toggle member may be about 1½ inches, but could be longer or shorter. For use as a structural fastener, screws or bolts of ¼ inch in diameter will probably require greater thickness of sheet material.

While the invention has been illustrated and described with respect to a preferred embodiment thereof, it will be recognized that the invention may be otherwise variously embodied and practiced within the scope of the claims which follow.

I claim:

1. A fastening means for joining two or more members together which comprises:
   a. a flexible, non-expandable toggle member formed from sheet material lying in a plane,
      1) said toggle member having a centrally located aperture to permit the threaded insertion of a screw member,
   b. a screw member threaded through said aperture,
   c. said toggle member having a leading portion thereof formed in said plane on one side of said aperture in said toggle member and a trailing portion on the other side of said aperture,
   d. said trailing portion being arcuately deformed out of the plane of said leading portion by a maximum amount slightly less than the outer diameter of the thread on said screw member,
   e. said aperture in said toggle member being sufficiently small to provide a bearing surface in engagement with a thread on said screw member by an amount substantially in excess of 180 degrees in order to resist retrograde movement of said screw member,
   f. said toggle member being pivoted on said screw member after passing through the members being fastened to a position at right angles to said screw member and against a far side of an innermost member being fastened.

2. A fastening means as defined in claim 1 wherein said trailing portion of said toggle member is folded under to provide a double thickness of sheet material adjacent said aperture in said toggle member for engagement with a screw thread of said screw member.

3. A fastening means as defined in claim 1 wherein an innermost edge of said leading portion of said toggle member adjacent said aperture is turned downwardly toward a longitudinal axis of said screw member so as to contact and impede retrograde movement of the threads of said screw member at the inception of pivotal movement of said toggle member toward a position at right angles to said screw member in which position said screw member is rotated to draw said toggle member flush with a backside of an innermost member being fastened.

4. A fastening means as defined in claim 1 wherein said leading portion of said toggle member has longitudinal edge portions which are folded upon itself out of the plane of said leading portion in the same direction that said trailing portion is deformed from said plane to define bracing portions 32a, 32b which establish an angle of slightly less than 60 degrees with said plane from which bracing portions 32a, 32b are folded to establish a bracing for the threads of said screw member to ensure that said bracing portions 32a, 32b bow inwardly under stress resulting from the drawing of said toggle member flush with a backside of an innermost member of said members being fastened.

5. An article of manufacture which comprises:
   a. a toggle member for use in combination with a screw member for fastening two or more members together,
      1) said toggle member being formed from sheet material lying in a plane which is flexible and non-expandable,
      2) said toggle member having a centrally located aperture to receive a fastening screw member,
      3) said toggle member having a leading portion thereof formed in said plane on one side of said aperture in said toggle member and a trailing portion on the other side of said aperture,
      4) said aperture in said toggle member being sufficiently small to provide a bearing surface in engagement with a thread on said screw member by an amount substantially in excess of 180 degrees in order to resist retrograde movement of said screw member,
      5) said trailing portion being arcuately deformed out of the plane of said leading portion contiguous to said aperture by a maximum amount slightly less than the outer diameter of the thread on the screw member used to effect said fastening whereby said toggle member may be pivoted on said screw member after said toggle member is passed through said members being fastened to a position at right angles to said screw member and against a backside of an innermost member of said members being fastened.

6. An article of manufacture as defined in claim 5 wherein said trailing portion of said toggle member is folded under to provide a double thickness of sheet material adjacent said aperture in said toggle member for engagement with a screw thread of said screw member.

7. An article of manufacture as defined in claim 5 wherein an innermost edge of said leading portion of said toggle member adjacent said aperture is turned downwardly toward a longitudinal axis of a screw member to be inserted through said aperture so as to contact and impede retrograde movement of the threads of said screw member at the inception of pivotal movement of said toggle member toward a position at right angles to said screw member in which position said screw member is rotated to draw said toggle member flush with a backside of an innermost member of said members being fastened.

8. A fastening means as defined in claim 5 wherein said leading portion of said toggle member has longitudinal edge portions which are folded upon itself out of the plane of said leading portion in the same direction that said trailing portion is deformed from said plane to define bracing portion is 32a, 32b which establish an angle of slightly less than 60 degrees with said plane from which bracing portions 32a, 32b are folded to establish a bracing for the threads of said screw member to ensure that said bracing portions 32a, 32b bow inwardly under stress resulting from the drawing of said toggle member flush with a backside of an innermost member of said members being fastened.

* * * * *